(12) United States Patent
Kim et al.

(10) Patent No.: US 10,914,650 B2
(45) Date of Patent: Feb. 9, 2021

(54) METHOD OF CALIBRATING OFFSET OF PRESSURE SENSOR

(71) Applicants: HYUNDAI MOTOR COMPANY, Seoul (KR); KIA MOTORS CORPORATION, Seoul (KR)

(72) Inventors: Seon Hak Kim, Suwon-si (KR); Soon Il Jeon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 589 days.

(21) Appl. No.: 15/784,584

(22) Filed: Oct. 16, 2017

(65) Prior Publication Data

US 2018/0292284 A1 Oct. 11, 2018

(30) Foreign Application Priority Data

Apr. 11, 2017 (KR) .................. 10-2017-0046436

(51) Int. Cl.
*G01L 27/00* (2006.01)
*H01M 8/0438* (2016.01)
(Continued)

(52) U.S. Cl.
CPC ......... *G01L 27/002* (2013.01); *H01M 8/0438* (2013.01); *H01M 8/04302* (2016.02);
(Continued)

(58) Field of Classification Search
None
See application file for complete search history.

(56) References Cited

U.S. PATENT DOCUMENTS

| 4,204,422 A * | 5/1980 | Inoue | G01L 27/005 |
| | | | 73/1.62 |
| 4,848,096 A * | 7/1989 | Funahashi | F25B 49/005 |
| | | | 62/126 |

(Continued)

FOREIGN PATENT DOCUMENTS

| JP | 2013-93141 A | 5/2013 |
| KR | 10-0863545 B1 | 10/2008 |

(Continued)

*Primary Examiner* — Alexander Satanovsky
*Assistant Examiner* — Brent A. Fairbanks
(74) *Attorney, Agent, or Firm* — Morgan, Lewis & Bockius LLP

(57) ABSTRACT

A method of calibrating an offset of a pressure sensor, by which an offset of a sensing value of a pressure sensor, which detects a pressure of hydrogen in a fuel cell system, is accurately calibrated. The method includes receiving, by a controller, a sensing value of a pressure sensor which detects a hydrogen pressure in a state where a hydrogen supply starts after a start of a fuel cell system; counting, by the controller, a time for which the sensing value of the pressure sensor increases from a first pressure $P_1$ to a second pressure $P_2$; calculating, by the controller, an offset value corresponding to the counted time by use of stored setting data; and calibrating, by the controller, a subsequent sensing value of the pressure sensor by the calculated offset value in real time when the offset value is calculated.

11 Claims, 6 Drawing Sheets

(51) Int. Cl.
  *H01M 8/04302* (2016.01)
  *H01M 8/04537* (2016.01)
  *H01M 8/04746* (2016.01)

(52) U.S. Cl.
  CPC ... *H01M 8/04388* (2013.01); *H01M 8/04544* (2013.01); *H01M 8/04753* (2013.01); *H01M 2250/20* (2013.01)

(56) References Cited

U.S. PATENT DOCUMENTS

2012/0171590 A1* 7/2012 Matsumoto ......... H01M 8/0432
  429/442
2018/0148038 A1* 5/2018 Ulrey .................... B60W 20/15

FOREIGN PATENT DOCUMENTS

| KR | 10-1601460 B1 | 3/2016 |
| KR | 10-2016-0096556 A | 8/2016 |
| KR | 10-1646382 B1 | 8/2016 |

* cited by examiner

METHOD OF CALIBRATING OFFSET OF PRESSURE SENSOR

CROSS-REFERENCE TO RELATED APPLICATION

This application claims under 35 U.S.C. § 119(a) priority to Korean Patent Application No. 10-2017-0046436 filed on Apr. 11, 2017, the entire contents of which are incorporated herein by reference.

BACKGROUND

(a) Technical Field

The present disclosure relates to a method of calibrating an offset of a pressure sensor, and more particularly to a method of calibrating an offset of a pressure sensor, which is capable of accurately calibrating an offset of a sensing value of a pressure sensor which detects a hydrogen pressure in a fuel cell system.

(b) Background Art

A fuel cell system applied to a hydrogen fuel cell vehicle that is one of the environmentally-friendly vehicles includes a fuel cell stack which generates electric energy from an electrochemical reaction of reaction gas (hydrogen that is fuel gas and oxygen that is oxidizer gas), a hydrogen supply device which supplies hydrogen that is fuel gas to the fuel cell stack, an air supply device which supplies air including oxygen to the fuel cell stack, a heat and water management system which controls an operation temperature of the fuel cell stack and performs a water management function, and a fuel cell system controller which controls a general operation of the fuel cell system.

In the typical fuel cell system, the hydrogen supply device includes a hydrogen storing unit (hydrogen tank), a regulator, a hydrogen pressure adjusting valve, a hydrogen recirculating device, and the like, the air supply device includes an air blower or a compressor, a humidifier, and the like, and the heat and water management system includes an electric water pump (coolant pump), a water tank, a radiator, and the like.

High pressure hydrogen supplied from the hydrogen tank in the hydrogen supply device is decompressed in the regulator to a predetermined pressure and then is supplied to the fuel cell stack, and in this case, the decompressed hydrogen is supplied to the fuel cell stack in the state where the quantity of hydrogen supplied is controlled under a pressure control according to an operation condition of the fuel cell stack.

The hydrogen remaining after the reaction in the fuel cell stack is discharged through an outlet terminal of a stack hydrogen electrode (anode) or is recirculated to an inlet terminal of the stack hydrogen electrode by the hydrogen recirculating device.

FIG. 1 shows a schematic diagram illustrating the hydrogen supply device, and illustrates a hydrogen pressure adjusting valve 1, pressure sensors 2 and 4, a fuel cell stack 3, and a hydrogen recirculating device.

A pressure of hydrogen passing through a regulator from a hydrogen tank (not illustrated) is adjusted by the hydrogen pressure adjusting valve 1 and then the hydrogen is supplied to the fuel cell stack 3, and the hydrogen pressure adjusting valve 1 adjusts the hydrogen decompressed by the regulator to a pressure appropriate to the stack operation condition.

In this case, the controller receives a feedback of sensing values of the pressure sensors 2 and 4 which are installed at a front end and a rear end of the stack 3 and controls an operation of the hydrogen pressure adjusting valve 1 to adjust a hydrogen pressure.

The hydrogen recirculating device is a device which improves reliability of a hydrogen supply and increases a life of a fuel cell, and FIG. 1 exemplifies a hydrogen recirculating device in a blower type.

As illustrated in FIG. 1, the hydrogen recirculating device may be formed by installing a recirculation blower 7 in a recirculation line 6, and recirculates non-reacted hydrogen which is left after being used in the hydrogen electrode (anode) of the fuel cell stack 3 to the hydrogen electrode to promote re-use of hydrogen.

In the fuel cell, when foreign substances, such as nitrogen, water, and vapor, flowing to the hydrogen electrode through an electrolyte membrane inside the stack 3 are increased, the quantity of hydrogen within the hydrogen electrode is decreased, so that reaction efficiency is decreased. Accordingly, purge is performed by opening a hydrogen purge valve 5 in accordance with a predetermined period.

That is, hydrogen of the hydrogen electrode is periodically discharged by installing the hydrogen purge valve 5 for purging hydrogen in a line at the outlet side of the hydrogen electrode of the fuel cell stack 3, so that the foreign substances, such as nitrogen and water, are discharged and removed from the fuel cell stack together with hydrogen, thereby increasing a utilization rate of hydrogen.

In the meantime, the hydrogen fuel needs to be adjusted and supplied according to, for example, the quantity of current of the stack, and the quantity of fuel, that is, the quantity of hydrogen supplied, supplied to the fuel cell stack 3 may be adjusted by controlling a hydrogen supply pressure by using the hydrogen pressure adjusting valve 1, and in order to increase the current of the stack, it is necessary to increase the quantity of hydrogen in a reaction surface within the stack by increasing the hydrogen supply pressure.

In this case, the hydrogen supply needs to be precisely controlled so that the quantity of current of the stack corresponds to a pressure, and when hydrogen with a higher pressure than a required hydrogen pressure is supplied, energy efficiency is degraded, so that fuel efficiency is degraded.

When a hydrogen pressure is low, durability of the stack is sharply decreased within a short time, so that the stack may be severely damaged.

As described above, the hydrogen supply in the fuel cell system is directly connected with durability and performance of the stack, and the hydrogen supply during an operation of the fuel cell system always needs to maintain a normal state, and to this end, the pressure sensors 2 and 4 detecting a hydrogen pressure also always need to maintain a normal state.

Particularly, the pressure sensors 2 and 4 in the fuel cell system are installed in a pipe, through which hydrogen flows, to detect a hydrogen pressure, and are very important components for reliably controlling the quantity of hydrogen supplied.

When the pressure sensors 2 and 4 have failure or have offsets of sensing values, the fuel cell system may be damaged, so that when an abnormal situation, such as an offset of the pressure sensor, is generated, it is important to rapidly detect the abnormal situation and normally supply hydrogen.

Considering importance of reliability of the pressure sensor, the sensing values of the respective sensors may be simultaneously monitored by mounting the two pressure sensors 2 and 4, and a pressure required by the controller and detected pressures (sensing values) of the pressure sensors of the inlet and the outlet of the stack are analyzed to determine whether the pressure sensor is broken down.

For example, as a method of diagnosing failure of a pressure sensor, a sensing value of the pressure sensor of the inlet of the stack is compared with a sensing value of the pressure sensor of the outlet of the stack to determine failure based on a difference between the two sensing values, and it is possible to confirm a simple failure state, such as a case where a difference value exceeds a predetermined range and the sensing values of the two sensors represent considerably different values.

However, a measure to respond to the generation of the failure is absent.

The hydrogen pressure sensor is continuously degraded, so that a regular offset calibration is required, and when a "−" offset is generated in the sensing value of the pressure sensor, that is, a smaller hydrogen pressure value than an actual hydrogen pressure value is sensed, and the hydrogen pressure is controlled based on the sensed smaller hydrogen pressure value as a feedback value, the controlled hydrogen pressure is increased compared to an actually required numerical value, so that the quantity of hydrogen crossover generated due to the higher pressure of the hydrogen electrode (anode) than the required numerical value is increased, thereby degrading fuel efficiency.

When a "+" offset is generated in the sensing value of the pressure sensor, that is, a larger hydrogen pressure value than the actual hydrogen pressure value is sensed, the controlled hydrogen pressure is decreased to be lower than the actual required numerical value, so that the fuel cell may be degraded (due to a lack of hydrogen) due to the lower pressure of the hydrogen electrode than the required numerical value.

In order to solve the problem, Korean Patent No. 10-1601460 (Mar. 2, 2016) discloses a method of calibrating an offset of a pressure sensor based on an atmospheric pressure sensor inside a controller as a method of calibrating an offset when the offset is generated in a sensing value of a pressure sensor in the related art.

However, the method in the related art has a disadvantage in that a large error may be generated considering the fact that a measurement error of the controller and an error of the atmospheric pressure sensor may be generated.

There is a problem in that a hydrogen electrode (anode) is periodically exposed to an atmospheric pressure environment and then the offset needs to be calibrated, and when the hydrogen electrode is exposed to the atmospheric pressure environment, an interface between hydrogen and oxygen may be formed to cause carbon corrosion of a cathode during a start of the fuel cell system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art and to provide a method of calibrating an offset of a pressure sensor, which determines whether an offset of a pressure sensor detecting a hydrogen pressure in a fuel cell system is generated, accurately calculates an offset value according to a state of the pressure sensor, and accurately calibrates the offset of a sensing value of the pressure sensor.

In one aspect, the present invention provides a method of calibrating an offset of a pressure sensor, the method including: receiving, by a controller, a sensing value of a pressure sensor which detects a hydrogen pressure in a state where a hydrogen supply starts after a start of a fuel cell system; counting, by the controller, a time for which the sensing value of the pressure sensor increases from a first pressure $P_1$ to a second pressure $P_2$; calculating, by the controller, an offset value corresponding to the counted time by use of stored setting data; and calibrating, by the controller, a subsequent sensing value of the pressure sensor by the calculated offset value in real time when the offset value is calculated.

Accordingly, according to the method of calibrating the offset of the pressure sensor according to the present invention, whenever the fuel cell system starts, it is possible to determine whether an offset is generated in the pressure sensor, determine a state of the generated offset (the discrimination between a "−" offset and a "+" offset), calculate an offset value, and accurately calibrate the offset of the pressure sensor by using a time of increasing pressure $\Delta t$ for which a sensing value of the pressure sensor at an initial stage of the start of a fuel cell system increases from a first pressure to a second pressure in the state where a hydrogen supply starts, thereby preventing the fuel cell stack from being operated in the state where the hydrogen supply is excessive or short.

According to the present invention, it is possible to expect an effect in improving reliability of the pressure sensor and improving reliability of the calibration of the offset.

It is possible to solve a problem of fuel efficiency degradation due to an increase of the quantity of hydrogen crossover generated due to a higher pressure of a hydrogen electrode (anode) than a required numerical value when the "−" offset is generated in the pressure sensor, and solve a problem of deterioration of a fuel cell due to a lack of hydrogen generated due to a lower pressure of the hydrogen electrode than the required numerical value when the "+" offset is generated in the pressure sensor.

Unlike the method in the related art, when an offset is calibrated, the hydrogen electrode is not exposed to the air, so that it is possible to prevent carbon corrosion of a cathode due to the forming of an interface between hydrogen and oxygen generated when the hydrogen electrode is exposed to the air, and solve a problem in the related art in that fuel cell deteriorates when the offset is calibrated.

It is possible to periodically diagnose failure and calibrate an offset for a continuously degraded pressure sensor, and when the offset of the pressure sensor is excessive, the present invention may diagnose that the pressure sensor is broken down to induce a replacement of the sensor.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
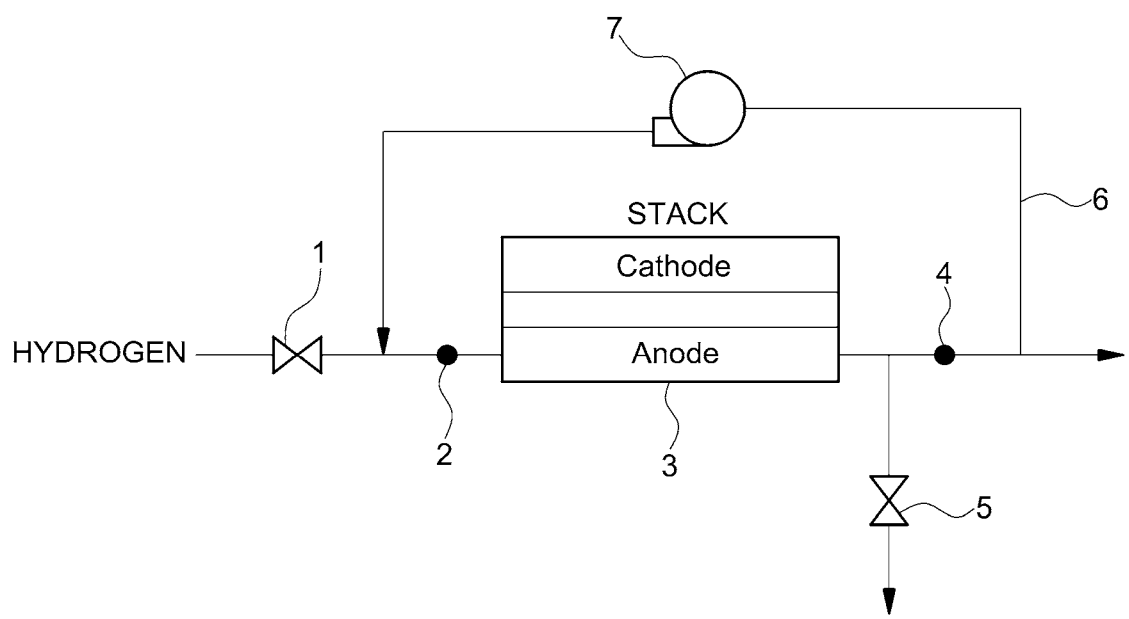
FIG. 1 shows a diagram illustrating an installation state of a hydrogen pressure sensor in a general fuel cell system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that those with ordinary skill in the art to which the present invention pertains may easily carry out the exemplary embodiment. However, the present invention is not limited to the exemplary embodiment described herein, and may also be implemented in various different forms.

Throughout the specification and the claims, unless explicitly described to the contrary, the word "comprise" and variations such as "comprises" or "comprising" will be understood to imply the inclusion of stated elements but not the exclusion of any other elements.

Figure 2:
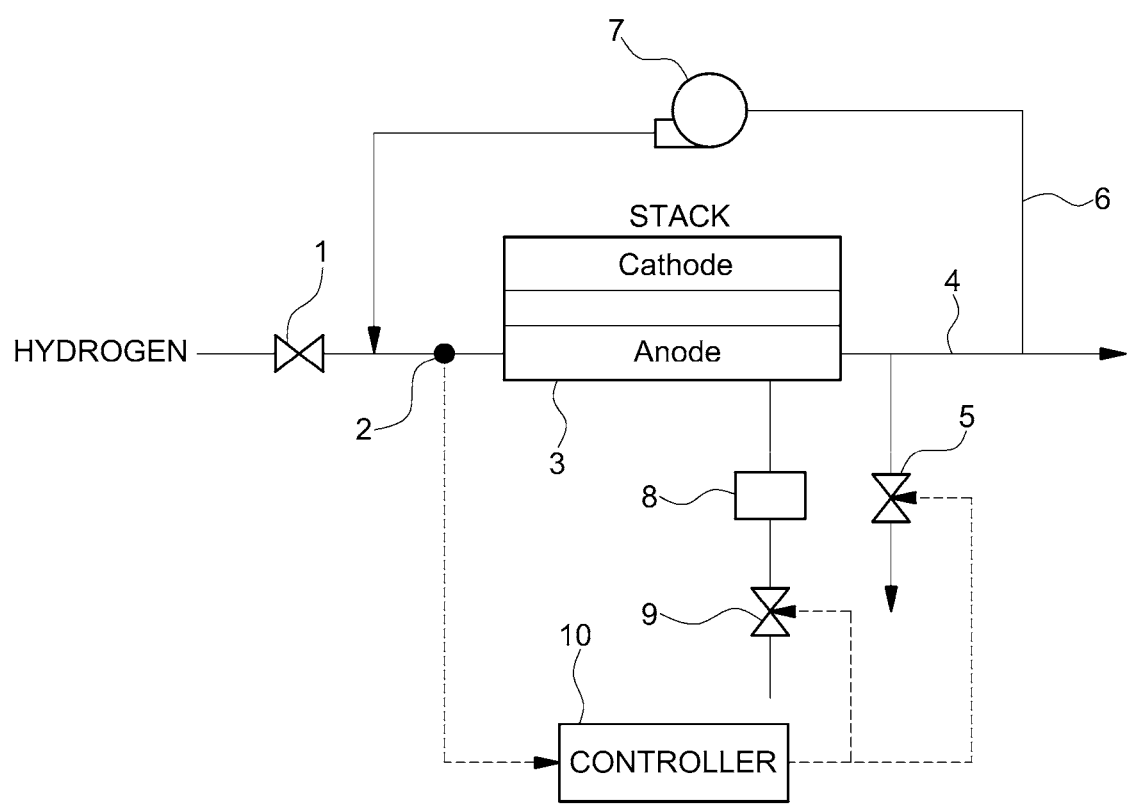
FIG. 2 shows a diagram illustrating a controller and a pressure sensor performing an offset calibration process according to the present invention.

In the description below, the present invention will be described based on a pressure sensor that is a target for a calibration of an offset according to the present invention, that is, a pressure sensor, on which a sensing value offset calibration and a failure determination are performed, according to the present invention is a pressure sensor 2 installed in a pipe (that is, a hydrogen supply pipe connected to an inlet of a hydrogen electrode of the fuel cell stack 3) at an inlet side of a fuel cell stack 3 so as to detect a hydrogen pressure (that is, a hydrogen supply pressure) supplied to a fuel cell stack 3 as illustrated in FIG. 2 as an example, as a pressure sensor detecting a hydrogen pressure in a fuel cell system.

However, the present invention is not limited to the failure determination and the offset calibration for the hydrogen pressure sensor at the inlet side of the fuel cell stack 3 (that is, the inlet pressure sensor), and the failure determination and offset calibrating method according to the present invention may also be equally applied to an outlet pressure sensor 4 (FIG. 1) installed in a pipe at an outlet side of the fuel cell stack 3, that is, a pipe connected to an outlet side of the hydrogen electrode of the fuel cell stack 3.

In this case, it is possible to individually determine failure and calibrate an offset by applying the method according to the present invention to each of the inlet pressure sensor and the outlet pressure sensor.

In the description below, regarding a sensing value offset (deviation) of the pressure sensor, an offset state, in which a lower hydrogen pressure than an actual hydrogen pressure is sensed by the pressure sensor and a sensing value of the pressure sensor is smaller than a value of the actual hydrogen pressure, is defined as a "−" offset.

Regarding a sensing value offset, an offset state, in which a higher hydrogen pressure than an actual hydrogen pressure is sensed by the pressure sensor and a sensing value of the pressure sensor is larger than a value of the actual hydrogen pressure, is defined as a "+" offset.

Figure 3:
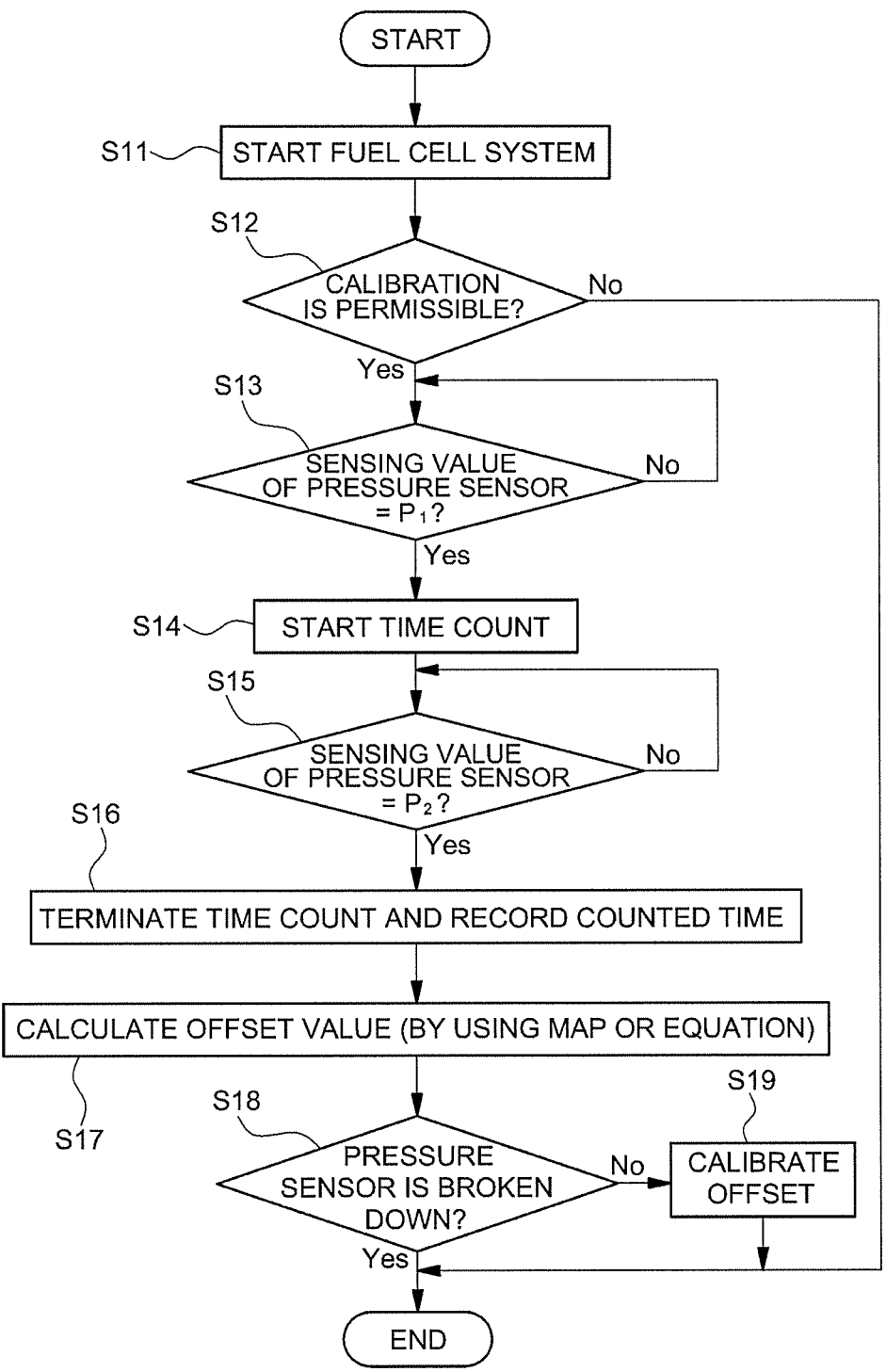
FIG. 3 shows a flowchart illustrating the offset calibration process according to the present invention.

FIG. 2 shows a diagram illustrating a controller and the pressure sensor performing an offset calibration process according to the present invention, and FIG. 3 shows a flowchart illustrating the offset calibration process according to the present invention.

As illustrated in FIG. 2, the hydrogen pressure sensor 2 detecting a hydrogen pressure may be installed in a hydrogen supply pipe, and a controller 10 receives a hydrogen pressure sensing value which is output from the pressure sensor 2 in a form of an electric signal.

The controller 10 maybe an electronic circuitry that performs an offset calibration process according to the present invention illustrated in FIG. 3, and the offset calibration process performed by the controller 10 includes an operation S12 of determining whether a calibration is permissible performed after the fuel cell system starts (S11), operations S13 to S16 of measuring a time of increasing pressure, an operation S17 of calculating an offset value, an operation S18 of determining failure, and an operation S19 of calibrating an offset.

First, as illustrated in FIG. 3, the controller 10 starts the fuel cell system (S11), and then determines whether a calibration is permissible based on information collected in the fuel cell system (S12), and only when all of the calibration permissible conditions are satisfied, a subsequent offset calibration process according to the present invention is performed.

Herein, the satisfaction of the calibration permissible condition means a case where a condition in which a hydrogen pressure in the fuel cell stack 3 approximately maintains a uniform value, that is, a condition in which a hydrogen pressure is steady, before a supply of hydrogen starts after the start of the fuel cell system is satisfied.

More particularly, the satisfaction of the calibration permissible condition means a case where a condition in which a hydrogen pressure maintains a uniform value or a condition in which a hydrogen pressure may maintain a uniform value is satisfied, and the calibration permissible condition includes a condition in which a sensing value of the pressure sensor is maintained within an initial pressure range.

That is, when the controller receives a sensing value of the pressure sensor and the sensing value of the pressure sensor is maintained within a predetermined initial pressure range, the controller determines that the calibration permissible condition is satisfied.

In addition to this, the calibration permissible condition may further include a condition in which a voltage of the fuel cell stack 3 is less than a predetermined voltage, and may further include a condition in which hydrogen purging is not operated, and may further include a condition in which a drain valve 9 of a water trap 8 is in a closed state.

The controller 10 is a controller of the fuel cell system, and as illustrated in FIG. 2, when it is set that the controller 10 controls the operations of a hydrogen purge valve 5 and the drain valve 9, the controller 10 may recognize non-operated states of the hydrogen purge valve 5 and the drain valve 9.

The hydrogen purging is performed by a periodical opening and closing operation of the hydrogen purge valve 5, and a condition in which the hydrogen purging is not operated means a condition in which there is no opening/closing operation of the hydrogen purge valve 5.

A typical fuel cell system includes the water trap 8 storing water discharged from the fuel cell stack 3, and the drain valve 9 which is opened for discharging stored water to the outside is installed in the water trap 8.

When the drain valve 9 is opened and water within the water trap 8 is discharged, particularly, water of the anode water trap is discharged, a hydrogen pressure of the fuel cell may be changed, and thus, the controller 10 determines that the calibration permissible condition is satisfied when the non-operation state, that is, a closed state, of the drain valve 9 is maintained.

This will be described in more detail. In order to determine whether the calibration is permissible, an initial pressure lower limit value $P_{i1}$ and an initial pressure upper limit value $P_{i2}$ are preset and stored in the controller, and in a process of determining whether the calibration is permissible, the controller determines whether an initial pressure value detected by the pressure sensor, that is, an initial sensing value of the pressure sensor, is within an initial pressure range that is a range between the initial pressure lower limit value $P_{i1}$ and the initial pressure upper limit value $P_{i2}$.

That is, when the initial sensing value of the pressure sensor is equal to or greater than the initial pressure lower limit value and is equal to or lower than the initial pressure upper limit value ($P_{i1} \leq$ initial sensing value $\leq P_{i2}$), it is determined that the initial sensing value of the pressure sensor is within the initial pressure range.

Herein, both the initial pressure lower limit value $P_{i1}$ and the initial pressure upper limit value $P_{i2}$ may be set to pressure values equal to or lower than a value of the atmospheric pressure, and the initial pressure upper limit value is set to a larger pressure value than the initial pressure lower limit value.

Both the initial pressure lower limit value and the initial pressure upper limit value are set to smaller pressure values than a value of a first pressure $P_1$ to be described below.

In the process of determining whether the calibration is permissible, the controller compares a fuel cell stack voltage detected by a voltage detecting unit with a predetermined voltage and determines whether the fuel cell stack voltage is less than the predetermined voltage, and checks whether the hydrogen purging is in a non-operation state and the drain of the water trap is in a non-operation state.

The calibration permissible condition is a condition predetermined in the controller in order to confirm the steady state of the hydrogen pressure of the fuel cell at an initial stage of the start of the fuel cell, and when the calibration permissible condition is satisfied, the controller may determine that the hydrogen pressure of the fuel cell is in a steady state.

That is, the controller determines whether the calibration is permissible by confirming the steady state of the hydrogen pressure of the fuel cell, and only in the steady state of the hydrogen pressure, an offset of the pressure sensor is calibrated by the controller.

The hydrogen pressure during the operation of the fuel cell system is changed according to a current output of the fuel cell, a material transmission within the fuel cell, the hydrogen purging, and the operation of the drain of the water trap, so that it is difficult to secure the steady state of the hydrogen pressure.

Accordingly, in the present invention, when the condition in which the sensing value of the pressure sensor at the initial stage of the start of the fuel cell system is within the initial pressure range, the condition in which the fuel cell stack voltage is less than the predetermined voltage, and the condition in which the hydrogen purging of the fuel cell is not operated and the drain (water discharge) of the water trap is not operated are satisfied, the controller determines that the hydrogen pressure is in the steady state to perform the process of calibrating the offset of the pressure sensor.

The hydrogen pressure of the fuel cell is not sharply changed at the initial state of the start (including a re-start) of the fuel cell system, and the initial pressure lower limit value $P_{i1}$ and the initial pressure upper limit value $P_{i2}$ which regulate the initial pressure range are set to pressure values which satisfy the condition in which the hydrogen pressure is maintained in the steady state and are equal to or lower than the value of the atmospheric pressure.

As is known, cathode oxygen depletion (COD) which removes residual hydrogen or oxygen within the fuel cell stack 3 is performed by connecting an electric load device acting as the kind of resistance to the fuel cell stack 3 when the starting of the fuel cell system is terminated, and in this case, a lower negative pressure than the atmospheric pressure is formed in the hydrogen electrode (the anode) within the fuel cell stack 3.

Accordingly, the hydrogen pressure in the condition in which the hydrogen pressure maintains the steady state at the initial state of the start represents a pressure equal to or lower than the atmospheric pressure, and thus, the initial pressure lower limit value $P_{i1}$ and the initial pressure upper limit value $P_{i2}$ are preset in the controller 10 with the pressure values equal to or lower than the value of the atmospheric pressure.

The setting voltage for determining whether the calibration is permissible at the initial stage of the starting of the fuel cell is set to a specific value for confirming a state where there is no reaction of the fuel cell inside the fuel cell stack 3.

Next, when the controller 10 determines that all of the calibration permissible conditions are satisfied after the start of the fuel cell system, the controller 10 starts to count a time when the pressure value detected by the pressure sensor 2, that is, the sensing value of the pressure sensor, reaches a predetermined first pressure $P_1$ after the hydrogen supply starts (S13 and S14).

Then, when the hydrogen pressure, that is, the sensing value of the pressure sensor, increases and reaches a second pressure $P_2$ (S15), the controller terminates the counting of the time and records and stores the counted time in the memory (S16).

Herein, the first pressure $P_1$ and the second pressure $P_2$ are preset in the controller 10 with specific larger pressure values than a value of the atmospheric pressure.

As described above, the controller 10 counts a time for which the sensing value of the pressure sensor 2 continuously increases after reaching the first pressure $P_1$ and then reaches the second pressure $P_2$, that is, a time of increasing pressure $\Delta t$ for which the sensing value of the pressure sensor 2 reaches from the first pressure P1 to the second pressure $P_2$, and then the controller 10 calculates an offset value by using setting data from the counted time $\Delta t$ (S17).

The setting data is setting information input and stored in the memory of the controller in advance, and is data defining a correlation between the time (a time of the pressure increase from $P_1$ to $P_2$), for which the sensing value of the pressure sensor increases from the first pressure $P_1$ to the second pressure $P_2$ and the offset value, and may be a map or an equation wherein the time is set as a variable and based on the variable the offset value is calculated.

In the case of the map, the offset value may be preset as a map value according to the counted time, and the equation, which is a function by which the offset value is calculated based on the counted time as a variable, may be pre-obtained and used.

The setting data of the map or the equation may be calculated by use of data obtained through an advanced test and an evaluation, and the same fuel cell system and the sensor having the same specification are used in the advanced test and evaluation process.

In this case, a predetermined offset (an offset value is already known) is pre-generated in the pressure sensor, and the fuel cell system is soaked for a sufficient time, and then the controller records the time for which the sensing value of the pressure sensor reaches from the first pressure to the second pressure by supplying hydrogen under the same start operation and the same operation condition.

The map, in which a correlation between the time and the offset value is defined, that is, the map, by which an offset value corresponding to a time is calculated based on a time as an input variable, is written by repeating the process while changing the offset (the already-known offset value) of the pressure sensor, and then the map is input and stored in the controller to be used.

Otherwise, when the offset value and the time data are calculated through a repeated test, the equation as the setting data, that is, the equation, wherein the time is set as a variable and based on the variable the offset value is calculated, may be obtained through a polynomial curve fitting process by using the data.

Here, for example, an equation of a quadric function may be obtained through the $2^{nd}$ polynomial curve fitting process, and the equation below represents a more particular example.

$$P_{offset} = Ax^2 + Bx + C \quad \text{[Equation 2]}$$

Herein, as an example of a simulation, A=−5.571, B=−11.85, C=3.714, x=($\Delta t$−60)/36.1, and in this case, $\Delta t$ represents a time of increasing pressure for which the sensing value of the pressure sensor reaches from the first pressure $P_1$ to the second pressure $P_2$.

The calculation of the offset value will be further described. In the present invention, the controller confirms that the hydrogen electrode (anode) of the fuel cell stack 3 is in a steady state with respect to the hydrogen pressure, and subsequently, the controller calibrates the offset based on the pressure (the sensing value of the pressure sensor) increase time (which is related to a pressure increase speed) after the start of the hydrogen supply.

Figure 4:
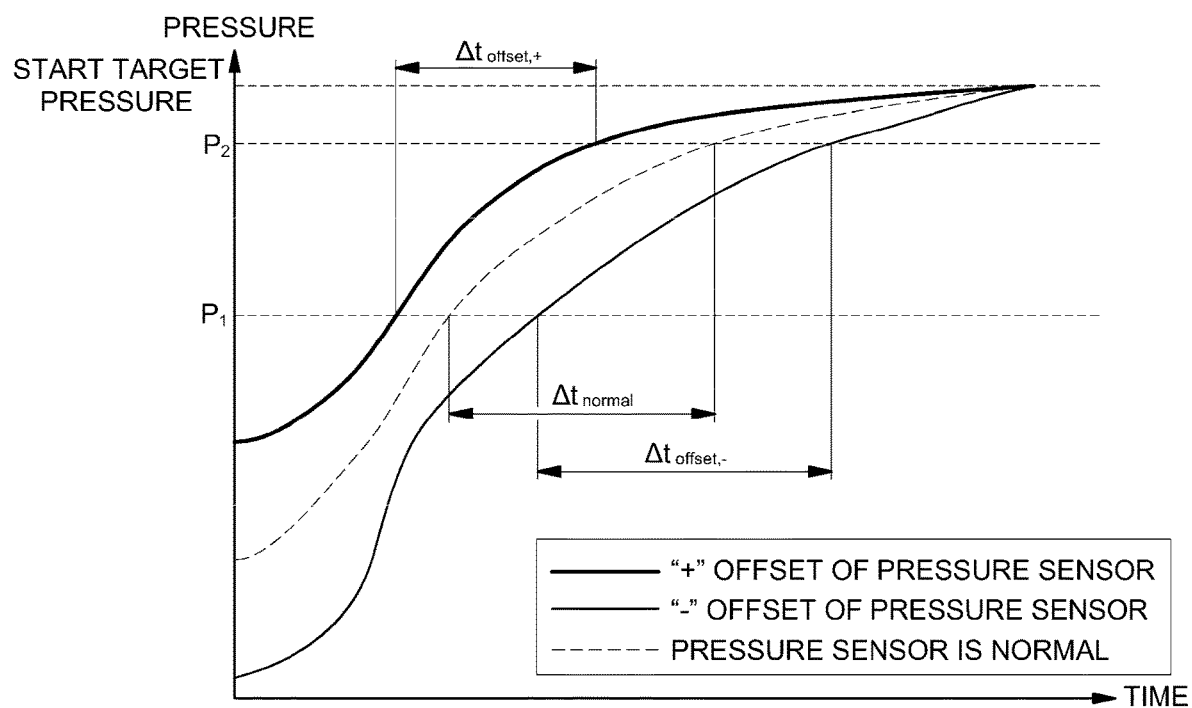
FIG. 4 shows a diagram illustrating a comparison of pressure sensing values between a normal state of the pressure sensor and a state where an offset is generated in the present invention.

FIG. 4 shows a diagram illustrating a comparison of pressure sensing values between a normal state of the pressure sensor and a state where an offset is generated, and an increase speed of a sensing value of the pressure sensor at the initial stage of the starting after the start of the hydrogen supply during the start of the fuel cell system is changed according to the sensor state.

Referring to FIG. 4, in regards to the hydrogen pressure during the start of the fuel cell system, a start target pressure may be set, and the first pressure $P_1$ and the second pressure $P_2$ may be set to hydrogen pressure values in the state where the hydrogen pressure is increased to a predetermined pressure or more after the start of the hydrogen supply.

In this case, the first pressure $P_1$ and the second pressure $P_2$ may be set to specific pressure values larger than the value of the atmospheric pressure, and the second pressure $P_2$ has the larger value than the value of the first pressure $P_1$, but is set to a value smaller than that of the set start target pressure.

The first pressure and the second pressure are set so that some time is taken for the sensing value of the pressure sensor to increase from the first pressure $P_1$ to reach the second pressure $P_2$.

In FIG. 4, '$\Delta t_{offset,+}$' represents a time counted while the sensing value is increased from the first pressure $P_1$ to reach the second pressure $P_2$ in the state where a "+" offset is generated in the pressure sensor, and '$\Delta t_{offset,-}$' represents a time counted in the state where a "−" offset is generated in the pressure sensor.

"$\Delta t_{normal}$" represents a time counted when the pressure sensor is in a normal state without the generation of the offset.

Referring to FIG. 4, in counting the time taken for the sensing value of the pressure sensor to increase from the first pressure $P_1$ to reach the second pressure $P_2$ at the initial stage of the starting, at which the hydrogen supply starts, when the "+offset (deviation)" is generated in the pressure sensor, the sensing value of the pressure sensor generally has a larger value than that of the case where the pressure sensor is normal.

When the "−offset" is generated in the pressure sensor, the sensing value of the pressure sensor generally has a smaller value than that of the case where the pressure sensor is normal.

Particularly, when the "+" offset is generated, the time counted while the sensing value of the pressure sensor reaches from the first pressure $P_1$ to the second pressure $P_2$ is shorter than the time counted when the pressure sensor is normal.

When the "−" offset is generated, the time counted while the sensing value of the pressure sensor reaches from the first pressure $P_1$ to the second pressure $P_2$ is longer than the time counted when the pressure sensor is normal.

That is, in summarizing, the relationship is established as "$\Delta t_{offset,+} < \Delta t_{normal} < \Delta t_{offset,-}$" and it is possible to determine whether the "+" offset is generated in the pressure sensor, the "−" offset is generated in the pressure sensor, or the pressure sensor is in the normal state based on the counted time by using the relationship.

Figure 5:
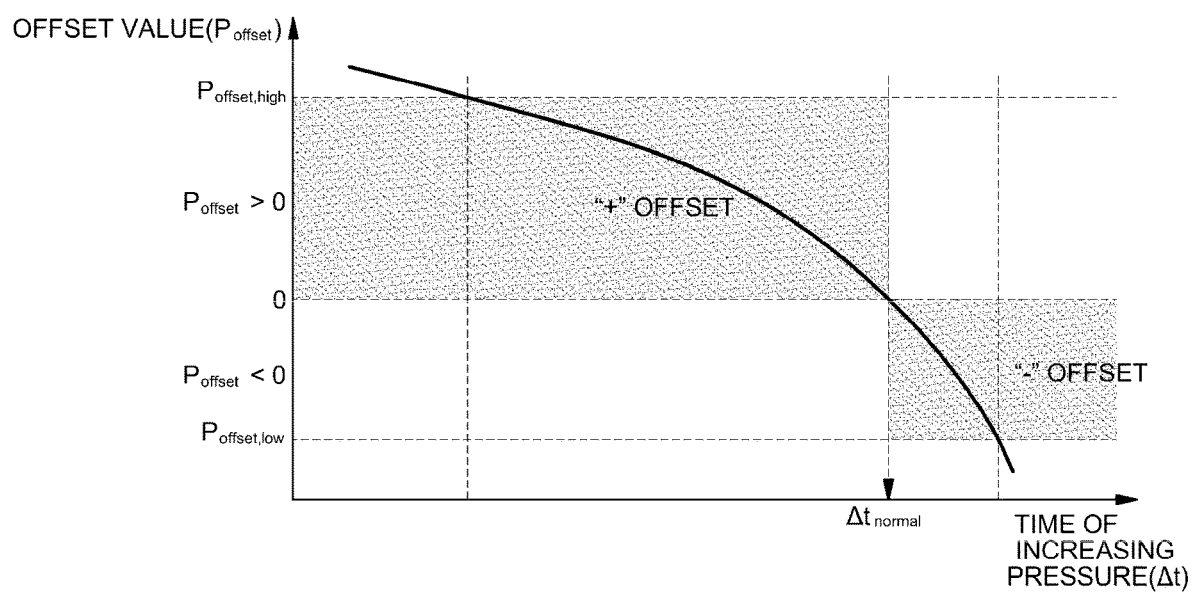
FIG. 5 shows a diagram illustrating an example of setting data based on which an offset value is calculated based on a counted time in the present invention.

FIG. 5 shows a diagram illustrating an example of setting data based on which an offset value is calculated based on a counted time in the present invention, and as illustrated in FIG. 5, when the counted time has a value smaller than "$\Delta t_{normal}$", the "+" offset is generated in the pressure sensor, and in contrast to this, when the counted time has a value larger than "$\Delta t_{normal}$", the "−" offset is generated in the pressure sensor.

Finally, the time $\Delta t_{normal}$ when the pressure sensor 2 is in the normal state is input and stored in the controller 10 in advance, and the counted time is compared with the time $\Delta t_{normal}$ after the termination of the counting of the time, it is possible to determine whether the offset is generated in the pressure sensor and the state of the generated offset (the "−" offset or the "+" offset).

As illustrated in FIG. 5, the offset value $P_{offset}$ in the state where the "+" offset is generated is set to a positive (+) value, and the offset value $P_{offset}$ in the state where the "−" offset is generated is set to a negative (−) value.

Next, when the offset value is calculated based on the counted time as illustrated in FIG. 3 and when an absolute value of the calculated offset value is an offset excessive state of exceeding a predetermined value, the controller 10 determines that the pressure sensor 2 is broken down (S18).

When the controller 10 determines that the pressure sensor has the failure that is the offset value excessive state, the controller 10 may be set to immediately shut down the fuel cell system.

In the meantime, in the case where the absolute value of the calculated offset value is less than the predetermined value, when the offset is calibrated for the sensing value of the pressure sensor 2, the fuel cell system is in an operable state by using the sensing value of the pressure sensor, so that the sensing value of the pressure sensor is calibrated in real time by using the calculated offset value (S19).

Herein, when it is assumed that a real-time sensing value before the calibration of the sensing value of the pressure sensor is "$P_{measure}$", the calculated offset value is "$P_{offset}$", and the real-time calibrated sensing value of the pressure sensor is "$P_{calibration}$", the calibrated sensing value of the pressure sensor may be represented as the equation below.

$$P_{calibration} = P_{measure} - P_{offset} \quad \text{[Equation 2]}$$

When the absolute value of the calculated offset value exceeds the predetermined value in operation S18, the controller determines that the pressure sensor 2 is broken down, and more particularly, when the calculated offset value $P_{offset}$ exceeds a predetermined offset upper limit value $P_{offset,high}$ or is less than a predetermined offset lower limit value $P_{offset,low}$, the controller 10 may be set to determine that the pressure sensor 2 has the failure by the excessive offset.

Herein, as illustrated in FIG. 5, $P_{offset,high}$ is set as a positive value and $P_{offset,low}$ is set as a negative value.

Figure 6:
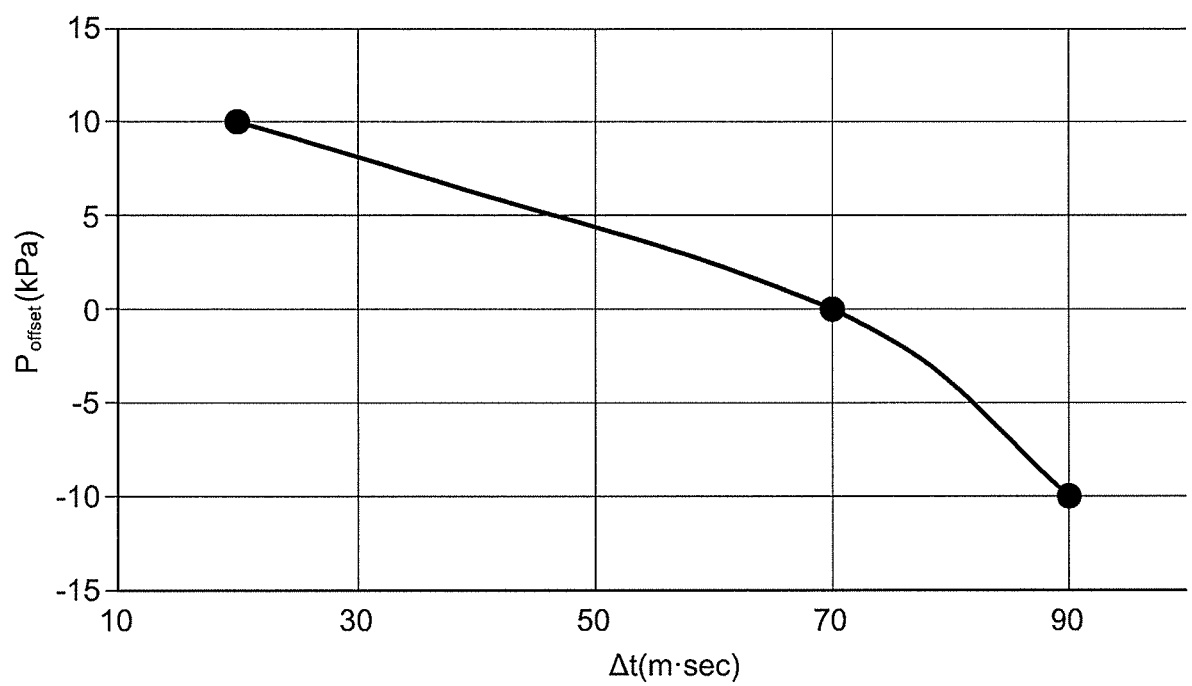
FIG. 6 shows a graph representing a comparison between an offset value and an increase time according to an offset state in the present invention.

Table 1 below represents a comparison between an offset value $P_{offset}$ (kPa) during an increase in a pressure and an increase time $\Delta t$ (msec) according to an offset by setting the first pressure $P_1$ to 110 kPa and the second pressure $P_2$ to 120 kPa, and FIG. 6 shows a graph representing a comparison between an offset value and an increase time according to an offset state.

TABLE 1

| $P_{offset}$ (kPa) | Time to reach $P_1$ (sec) | Time to reach $P_2$ (sec) | $\Delta t$ (msec) | Note |
|---|---|---|---|---|
| 10 | 0.15 | 0.17 | 20 | Rapidly increase compared to normal state |
| 0 | 0.1 | 0.17 | 70 | Normal |
| −10 | 0.08 | 0.17 | 90 | Slowly increase compared to normal state |

Accordingly, the present invention may determine, whenever the fuel cell system starts, whether an offset is generated in the pressure sensor, determine a state of the generated offset (the discrimination between the "−" offset and the "+" offset), calculate an offset value, and accurately calibrate the offset of the pressure sensor by using the time of increasing pressure $\Delta t$ for which the sensing value of the pressure sensor at the initial stage of the starting increases from the first pressure to the second pressure in the state where the hydrogen supply starts, thereby preventing the fuel cell stack 3 from being operated in the state where the hydrogen supply is excessive or short.

According to the present invention, it is possible to expect an effect in improving reliability of the pressure sensor and improving reliability of the calibration for the offset.

It is possible to solve a problem of fuel efficiency degradation due to an increase of the quantity of hydrogen crossover generated due to the higher pressure of the hydrogen electrode (anode) than a required numerical value when the "−" offset is generated in the pressure sensor, and solve a problem of deterioration of a fuel cell due to a lack of hydrogen generated due to the lower pressure of the hydrogen electrode than the required numerical value when the "+" offset is generated in the pressure sensor.

Unlike the method in the related art, when an offset is calibrated, the hydrogen electrode is not exposed to the air, so that it is possible to prevent carbon corrosion of the cathode due to the forming of the interface between hydrogen and oxygen generated when the hydrogen electrode is exposed to the air, and solve a problem in the related art in that fuel cell deteriorates when the offset is calibrated.

It is possible to periodically diagnose failure and calibrate an offset for the continuously degraded pressure sensor, and when the offset of the pressure sensor is excessive, the present invention diagnoses that the pressure sensor is broken down to induce a replacement of the sensor.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of calibrating readings acquired from a pressure sensor, the method comprising:
   step (a) of receiving, by a controller, a sensing value of the pressure sensor which detects a hydrogen pressure in a state where a hydrogen supply starts after a start of a fuel cell system;
   step (b) of counting, by the controller, a time for which the sensing value of the pressure sensor increases from a first pressure $P_1$ to a second pressure $P_2$;
   step (c) of calculating, by the controller, an offset value corresponding to the counted time by use of stored setting data; and step (d) of adding, by the controller, the calculated offset value to a subsequent sensing value of the pressure sensor until a next start of the fuel cell system,
wherein the setting data is a map in which an offset value is set as a value according to the time for which the sensing value of the pressure sensor increases from the first pressure $P_1$ to the second pressure $P_2$, or an equation wherein the time is set as a variable and based on the variable an offset value is calculated.

2. The method of claim 1, further comprising:
determining, by the controller, whether a calibration permissible condition is satisfactory based on information collected in the fuel cell system before the hydrogen supply starts after the start of the fuel cell system,
wherein only when the calibration permissible condition is satisfactory, all the steps: receiving of the sensing value; counting of the time; calculating of the offset value; and calibrating the sensing value of the pressure sensor in real time; are performed.

3. The method of claim 2, wherein the information includes the sensing value of the pressure sensor, and
the calibration permissible condition includes a condition where the sensing value of the pressure sensor is within an initial pressure range that is a range between an initial pressure lower limit value $P_{i1}$ and an initial pressure upper limit value $P_{i2}$.

4. The method of claim 3, wherein the initial pressure lower limit value $P_{i1}$ and the initial pressure upper limit value $P_{i2}$ are set in the controller as pressure values equal to or lower than a value of atmospheric pressure.

5. The method of claim 3, wherein the information further includes a fuel cell stack voltage detected by a voltage detecting unit, and
the calibration permissible condition further includes a condition where the detected fuel cell stack voltage is less than a predetermined voltage.

6. The method of claim 3, wherein the information further includes at least one of an operation state of hydrogen purging performed by a hydrogen purge valve and a drain operation state of a water trap, and
the calibration permissible condition further includes at least one of a condition where hydrogen purging is in a non-operated state and a condition where a drain value of a water trap is in a closed state.

7. The method of claim 1, wherein the first pressure $P_1$ and the second pressure $P_2$ are set in the controller as pressure values larger than a value of atmospheric pressure.

8. The method of claim 7, wherein the first pressure $P_1$ and the second pressure $P_2$ are set in the controller as pressure values smaller than a value of a predetermined start target pressure.

9. The method of claim 1, wherein a duration measured while pressure is increasing from the first pressure $P_1$ to the second pressure $P_2$ in the pressure sensor in a normal state, without generation of an offset, is pre-stored in the controller,
in the setting data, an offset value is set:
a positive value when the counted time in step (b) is shorter than the pre-stored time of increasing pressure or
a negative value when the counted time counted in step (b) is longer than the pre-stored time of increasing pressure.

10. The method of claim 9, wherein the real-time calibrated sensing value of the pressure sensor in step (d) is calculated by Equation E1 below by using the offset value calculated based on the sensing value of the pressure sensor before the calibration and the setting data, $$P_{calibration} = P_{measure} - P_{offset} \tag{E1}$$

wherein, $P_{measure}$ is the sensing value of the pressure sensor before the calibration, $P_{offset}$ is an offset value calculated from the setting data, and $P_{calibration}$ is the real-time calibrated sensing value of the pressure sensor.

11. The method of claim 1, further comprising:
determining, by the controller, that the pressure sensor is broken down when an absolute value of the calculated offset value exceeds a predetermined value.

\* \* \* \* \*